United States Patent
Seong et al.

(10) Patent No.: US 9,688,150 B2
(45) Date of Patent: Jun. 27, 2017

(54) SYSTEM AND METHOD FOR CONTROLLING ENVIRONMENTALLY-FRIENDLY VEHICLE

(71) Applicant: Hyundai Motor Company, Seoul (KR)

(72) Inventors: Jae Yong Seong, Gyeonggi-do (KR); Do Hoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/929,659

(22) Filed: Nov. 2, 2015

(65) Prior Publication Data

US 2016/0339782 A1     Nov. 24, 2016

(30) Foreign Application Priority Data

May 18, 2015    (KR) ........................ 10-2015-0068668

(51) Int. Cl.
    *B60L 3/04*        (2006.01)
    *B60L 3/00*        (2006.01)
    *B60L 11/18*      (2006.01)
    *B60R 21/0134*   (2006.01)

(52) U.S. Cl.
    CPC ............. *B60L 3/0007* (2013.01); *B60L 11/18* (2013.01); *B60R 21/0134* (2013.01)

(58) Field of Classification Search
    USPC ........ 701/22, 45, 301, 36, 70; 180/271, 282, 180/286
    See application file for complete search history.

(56) References Cited

U.S. PATENT DOCUMENTS

| | | | | |
|---|---|---|---|---|
| 3,840,036 A * | 10/1974 | Renk | ...................... | B60K 28/14 137/38 |
| 5,506,775 A * | 4/1996 | Tsurushima | ........ | B60R 21/0132 280/735 |
| 5,793,121 A * | 8/1998 | Burgess | ................. | B60K 28/14 180/279 |
| 6,279,596 B1 * | 8/2001 | Tavano | ................... | F16K 17/36 137/351 |
| 8,612,073 B2 * | 12/2013 | Fuji | .......................... | B60L 3/00 307/10.1 |

(Continued)

FOREIGN PATENT DOCUMENTS

| | | |
|---|---|---|
| JP | 2006-273069 A | 10/2006 |
| JP | 2011-183929 A | 9/2011 |

(Continued)

*Primary Examiner* — Thomas Tarcza
*Assistant Examiner* — Richard Goldman
(74) *Attorney, Agent, or Firm* — Mintz Levin Cohn Ferris Glovsky and Popeo, P.C.; Peter F. Corless

(57) ABSTRACT

A system and method for controlling an environmentally-friendly vehicle perform a safety function by blocking a high voltage output of a high voltage battery at the time of a rear-lateral side collision of the environmentally-friendly vehicle. The high voltage blocking function is smoothly performed at the time of the rear-lateral side collision accident by determining a rear-lateral side collision of the environmentally-friendly vehicle using a blind spot detection sensor, a lane change alert sensor, or a rear cross traffic alert sensor, along with a yaw rate sensor that detects a yaw rate, and turning off a relay of the high voltage battery at a moment when the rear-lateral side collision is determined.

11 Claims, 4 Drawing Sheets

[RCTA-ALERT VEHICLE AT BLIND SPOT DURING REVERSE]

(56) References Cited

U.S. PATENT DOCUMENTS

| | | | | |
|---|---|---|---|---|
| 8,633,826 B2* | 1/2014 | Kim | | H01M 10/443 320/132 |
| 8,749,350 B2* | 6/2014 | Geisler | | G07C 5/008 340/436 |
| 2003/0212480 A1* | 11/2003 | Lutter | | B60R 21/013 701/31.4 |
| 2006/0186702 A1* | 8/2006 | Kisanuki | | B60R 21/36 296/187.04 |
| 2007/0276600 A1* | 11/2007 | King | | G08G 1/042 701/301 |
| 2008/0097699 A1* | 4/2008 | Ono | | B60R 21/0134 701/300 |
| 2008/0183360 A1* | 7/2008 | Zhang | | B60W 50/14 701/70 |
| 2010/0044126 A1* | 2/2010 | Ohno | | B60L 3/0007 180/65.1 |
| 2011/0288700 A1* | 11/2011 | Pebbles | | B60L 3/04 701/22 |
| 2012/0016544 A1* | 1/2012 | Pariseau | | B60L 3/0038 701/22 |
| 2013/0116871 A1* | 5/2013 | Hashimoto | | B60L 11/1803 701/22 |
| 2013/0166153 A1* | 6/2013 | Ito | | F02D 29/02 701/45 |
| 2013/0304289 A1* | 11/2013 | Suzuki | | B60K 28/14 701/22 |
| 2014/0125260 A1* | 5/2014 | Hashimoto | | B60L 3/0069 318/380 |
| 2015/0006007 A1* | 1/2015 | Kitahata | | B60K 6/442 701/22 |
| 2015/0015208 A1* | 1/2015 | Katsumata | | H02J 7/0029 320/136 |
| 2015/0051771 A1* | 2/2015 | Greenwood | | B60L 3/04 701/22 |
| 2015/0094901 A1* | 4/2015 | Brenneis | | B60W 50/029 701/29.1 |
| 2015/0191087 A1* | 7/2015 | Uchida | | B60W 10/02 701/22 |
| 2015/0360569 A1* | 12/2015 | Kim | | B60L 3/0007 701/22 |

FOREIGN PATENT DOCUMENTS

| | | |
|---|---|---|
| JP | 2013-220675 A | 10/2013 |
| KR | 2012-0010377 A | 2/2012 |
| KR | 10-1460309 B1 | 11/2014 |

* cited by examiner

BSD SENSOR

[BSD-DETECT VEHICLE AT BLIND SPOT AND THEN ALERT DANGER]

[LCA-DETECT REAR REGION OF ADJACENT LANE AND THEN ALERT LANE CHANGE DANGER]

[RCTA-ALERT VEHICLE AT BLIND SPOT DURING REVERSE]

SYSTEM AND METHOD FOR CONTROLLING ENVIRONMENTALLY-FRIENDLY VEHICLE

CROSS-REFERENCE TO RELATED APPLICATION

This application claims under 35 U.S.C. §119(a) the benefit of Korean Patent Application No. 10-2015-0068668 filed on May 18, 2015, the entire contents of which are incorporated herein by reference.

BACKGROUND (a) Technical Field

The present invention relates to a system and method for controlling an environmentally-friendly vehicle, more particularly, to a system and method for controlling an environmentally-friendly vehicle that can block an output of a battery (for example, a high voltage battery) of the environmentally-friendly vehicle for safety at the time of a rear-lateral side collision accident.

(b) Description of the Related Art

A high voltage battery of an environmentally-friendly vehicle, such as a hybrid vehicle including an electric vehicle, is discharged for driving a motor of the vehicle, and charged by a power generator driven by regenerative braking or an engine while the vehicle is travelling.

The high voltage battery is included in a module together with an inverter and a cooling fan and the high voltage battery in the module is mounted inside the vehicle, and in particular, can be mounted at a bottom within a trunk room, a space between a rear surface of a rear seat and the trunk room, and the like.

When a collision occurs in an ignition on/ready situation of an environmentally-friendly vehicle, a high voltage blocking function of blocking a high voltage output from the high voltage battery is performed for safety.

In the related art, a method of blocking the high voltage output of the high voltage battery is carried out by turning off, by a high voltage battery controller, a relay of the high voltage battery when a detection sensor for deploying an airbag detects a collision of the environmentally-friendly vehicle, in which an airbag control unit generates an air bag deploying signal.

In this case, the high voltage battery is located at a bottom within a trunk room or a rear-lateral portion of the vehicle, such as a space between a rear surface of a rear seat and the trunk room, so that there is great concern about damage to the high voltage battery at the time of a rear-lateral side collision, as compared to a front collision.

However, the airbag detection sensor typically is arranged in a front portion of the vehicle, thereby failing to detect a rear-lateral side collision, and thus, a high voltage blocking function for the high voltage battery is not properly performed when a collision occurs at a rear-lateral side of the environmentally-friendly vehicle, so that there is a risk of an electric shock.

The above information disclosed in this Background section is only for enhancement of understanding of the background of the invention and therefore it may contain information that does not form the prior art that is already known in this country to a person of ordinary skill in the art.

SUMMARY

The present invention provides a system and method of controlling an environmentally-friendly vehicle, which allows the high voltage blocking function for the high voltage battery to be smoothly performed at the time of a rear-lateral side collision accident by determining that a rear-lateral side collision of the environmentally-friendly vehicle occurs by using a blind spot detection (BSD) sensor, a yaw rate sensor, and the like, and blocking a connection of the high voltage relay of the high voltage battery at a moment when the rear-lateral side collision is determined.

In one aspect, the present invention provides a system for controlling an environmentally-friendly vehicle, the system including: a rear-lateral side detection sensor configured to detect an expected collision time with and a distance from a collision object; and a controller configured to determine that a rear-lateral side collision situation occurs and to block a connection of a relay of a battery of the vehicle when the expected collision time detected by the rear-lateral side detection sensor is equal to or smaller than a first threshold value and a distance from the collision object detected by the rear-lateral side detection sensor is equal to or smaller than a second threshold value.

In a preferred embodiment, when a yaw rate detected by a yaw rate detection sensor is equal to or larger than a third threshold value before the connection of the relay of the battery of the vehicle is blocked, the controller may block the connection of the battery of the vehicle.

In another preferred embodiment, the rear-lateral side detection sensor, which detects an expected collision time with and a distance from a collision object, may be one or more of a blind spot detection (BSD) sensor, a lane change alert (LCA) sensor, and a rear cross traffic alert (RCTA) sensor.

In another aspect, the present invention provides a method of controlling an environmentally-friendly vehicle, the method including: detecting, by a rear-lateral side detection sensor, an expected collision time with and a distance from a collision object; determining whether the expected collision time is equal to or smaller than a first threshold value; determining whether the distance is equal to or smaller than a second threshold value; and blocking a connection of a battery of the vehicle when the expected collision time is equal to or smaller than the first threshold value and the distance is equal to or smaller than the second threshold value.

In a preferred embodiment, the method may further include: determining whether a yaw rate of the vehicle is equal to or larger than a third threshold value, wherein when the yaw rate is equal to or larger than the third threshold value, the connection of the battery of the vehicle may be blocked.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
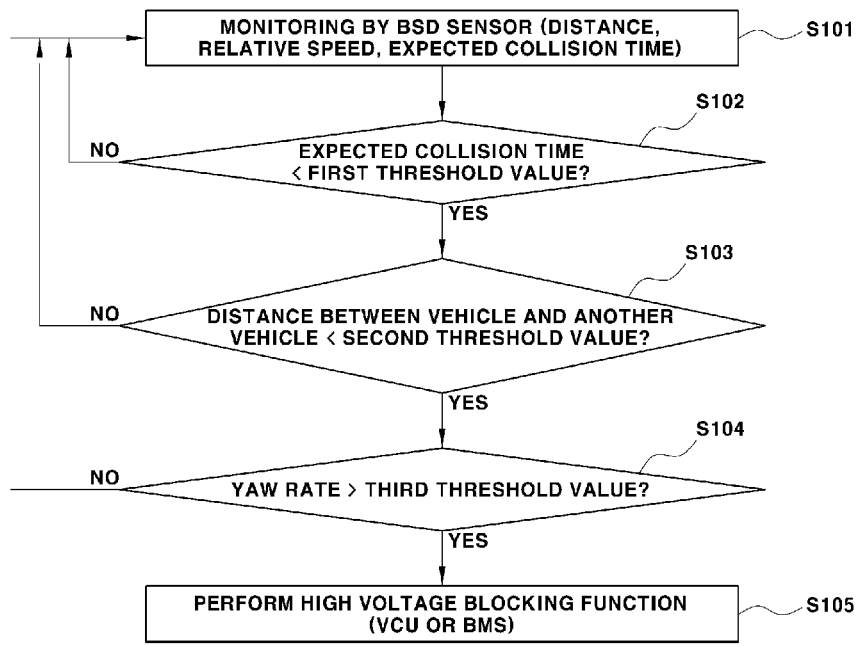
FIG. 1 is a flowchart illustrating a high voltage blocking method when an environmentally-friendly vehicle experiences a collision, according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, read only memory (ROM), random access memory (RAM), compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present invention will be described in detail with reference to the accompanying drawings.

The present invention enables a high voltage blocking function for a high voltage battery to be smoothly performed at the time of a rear-lateral side collision accident by turning off a high voltage relay of the high voltage battery at the time of the rear-lateral side collision of an environmentally-friendly vehicle.

To this end, in order to determine whether a rear-lateral side collision of the vehicle has taken place, a rear-lateral side detection sensor for detecting an expected collision time with and a distance from a collision object is provided.

One or more of a blind spot detection (BSD) sensor, a lane change alert (LCA) sensor, and a rear cross traffic alert (RCTA) sensor may be used as the rear-lateral side detection sensor for detecting an expected collision time with and a distance from a collision object.

Figure 4A:
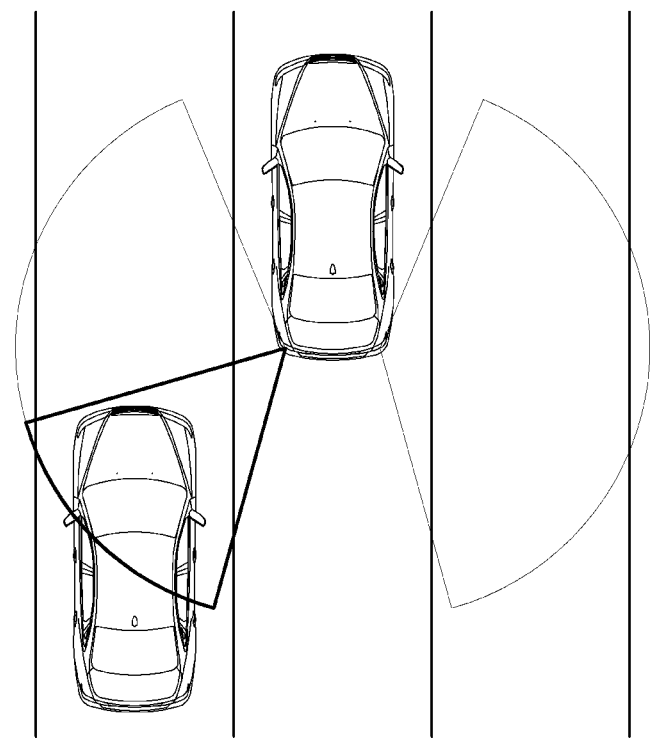
FIGS. 4A to 4C are schematic diagrams illustrating types and a detection range of a rear-lateral side detection sensor of the vehicle.
Figure 4B:
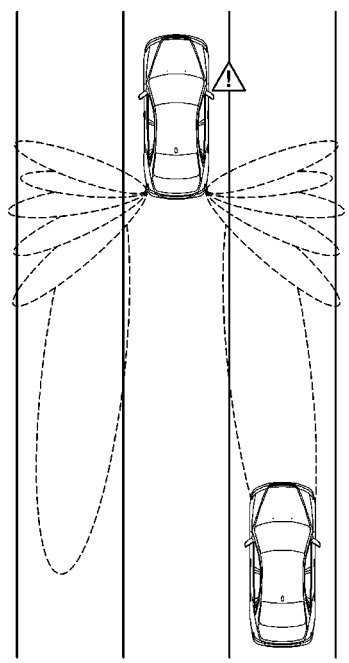
Figure 4C:
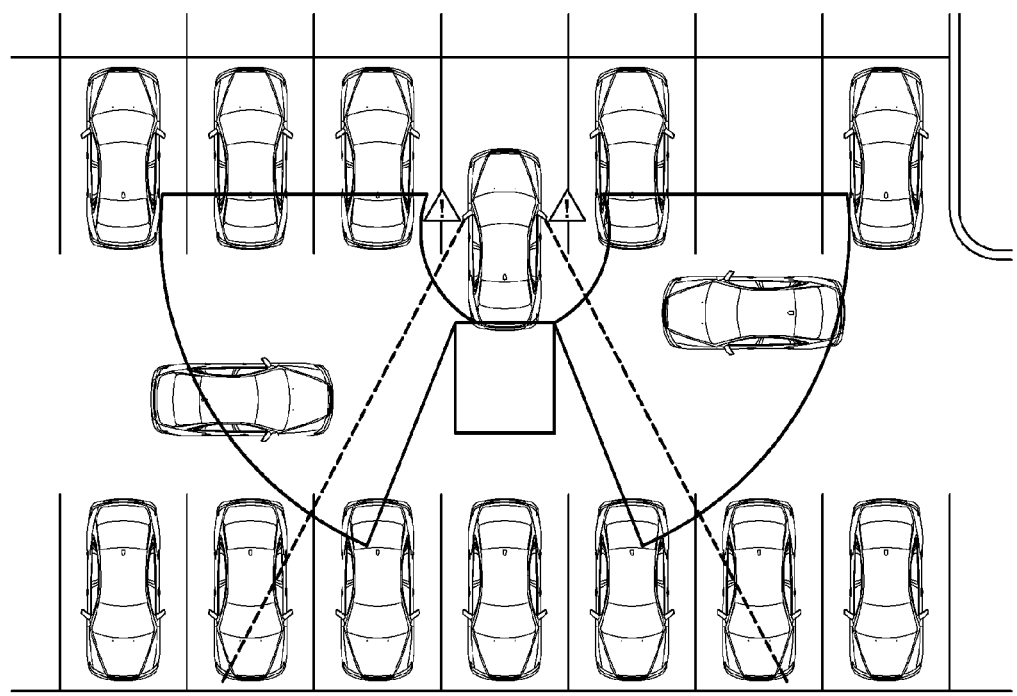

The BSD sensor is a sensor for detecting a vehicle or an object present at a lateral-rear side blind spot of the vehicle in the detection range of the BSD sensor as indicated by the arced zone and providing a danger alert, for example, as illustrated in FIG. 4A; the LCA sensor is a sensor for detecting a vehicle or an object present at a rear region of an adjacent lane in the detection range of the LCA sensor as indicated by the arced zone shown in FIB. 4B and providing an alert for changing a lane; and the RCTA sensor is a sensor for detecting a vehicle or an object present at a lateral-rear side of the vehicle when the vehicle reverses in the detection range of the RCTA sensor as indicated by the arced zone shown in FIG. 4C.

The BSD sensor, the LCA sensor, and the RCTA sensor may be used as the rear-lateral side detection sensor as described above, and/or any type of sensor for detecting a vehicle or an object located at a lateral-rear side of a vehicle is suitable.

A controller (for example, a battery management system (BMS)) or a vehicle control unit (VCU) that is a super ordinate controller of the BMS determines whether a rear-lateral side collision of the vehicle occurs based on a signal detected by the rear-lateral side detection sensor.

In particular, the controller determines a rear-lateral side collision situation based on an expected collision time with and a distance from a collision object and a relative speed which are detected by the rear-lateral side detection sensor.

In further detail, when an expected collision time with a collision object detected by the rear-lateral side detection sensor is equal to or smaller than a first threshold value and a distance from the collision object is equal to or smaller than a second threshold value, the controller determines a situation of the vehicle as a rear-lateral side collision situation, and then controls a relay to be turned off in order to block a connection of the relay of the high voltage battery.

In this case, a sensed value of a yaw rate detection sensor is further input into the controller in order to determine the rear-lateral side collision of the vehicle in preparation for a case where a malfunction is generated in the rear-lateral side detection sensor, or for a situation in which the vehicle barely avoids a collision.

Accordingly, when an expected collision time with a collision object detected by the rear-lateral side detection sensor is equal to or smaller than a first threshold value, a distance from the collision object is equal to or smaller than a second threshold value, and a yaw rate detected value detected by the yaw rate detection sensor is equal to or larger than a third threshold value, the controller determines that the vehicle is in a rear-lateral side collision situation, and then controls a relay to be turned off in order to block a connection of the relay of the high voltage battery.

Here, exemplary embodiments of the high voltage blocking method at a rear-lateral side collision of the environmentally-friendly vehicle based on the aforementioned system configuration will be described in order.

Figure 2:
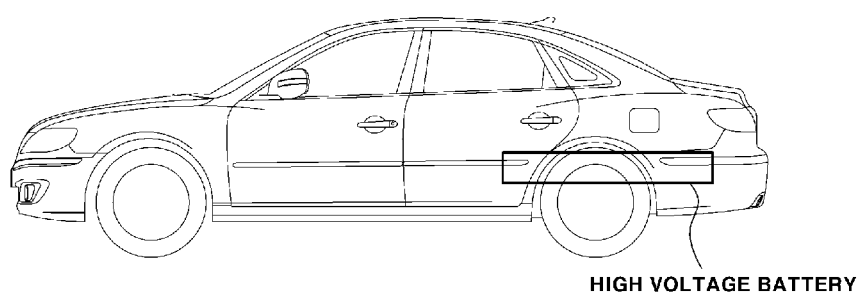
FIG. 2 is a schematic diagram illustrating a mounted location of a high voltage battery of the environmentally-friendly vehicle.

Referring to FIG. 2, the high voltage battery is mounted at a bottom within a trunk room or a rear-lateral portion of the vehicle, such as a space between a rear surface of a rear seat and the trunk room, so that there is a concern about damage to the high voltage battery at the time of a rear-lateral side collision compared to a front collision.

Figure 3:
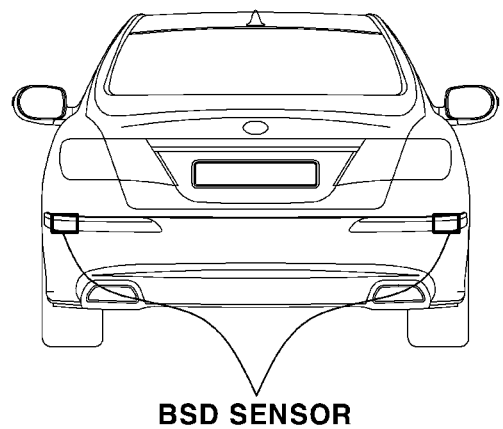
FIG. 3 is a schematic diagram illustrating a mounted location of a BSD sensor detecting a rear-lateral side collision of the environmentally-friendly vehicle.

Accordingly, the BSD sensor (see, e.g., the mounted location of FIG. 3) mounted at a cover part of a rear-lateral bumper of the vehicle is used for determining whether a rear-lateral side collision occurs, and implementing the high voltage blocking function of the high voltage battery.

First, the BSD sensor monitors a distance, a relative speed, an expected collision time, and the like with a vehicle or an object present at the rear-lateral side of the vehicle (S101).

The yaw rate detection sensor detects a current yaw rate of the vehicle, and transmits the detected value to the controller.

Next, when the yaw rate detected value is input to the controller together with a monitored signal of the BSD sensor, the controller determines whether a rear-lateral side collision occurs (S102 to S104).

In particular, when the expected collision time with the collision object detected by the BSD sensor is equal to or smaller than a first threshold value (S102), the distance from the vehicle or the collision object detected by the BSD sensor is equal to or smaller than a second threshold value (S103), and the yaw rate detected value detected by the yaw rate detection sensor is equal to or larger than a third threshold value (S104), the controller determines that the rear-lateral side collision occurs.

Accordingly, the controller controls the relay to be turned off in order to block a connection of the relay of the high voltage battery at a moment when the controller determines that the rear-lateral side collision occurs.

As described above, it is possible to make the high voltage blocking function for the high voltage battery be smoothly performed at the time of a rear-lateral side collision accident, and thus prevent fire and/or electric shock due to the high voltage battery at the time of the rear-lateral side collision by determining a rear-lateral side collision of the environmentally-friendly vehicle by using the BSD sensor, the yaw rate sensor, and the like, and blocking a connection of the relay of the high voltage battery at a moment when the rear-lateral side collision is determined.

Through the aforementioned technical solutions, the present invention provides the effects below.

According to the present invention, it is possible to make a high voltage blocking function for the high voltage battery be smoothly performed at the time of a rear-lateral side collision accident, and thus prevent fire and/or electric shock due to the high voltage battery at the time of the rear-lateral side collision by determining a rear-lateral side collision of the environmentally-friendly vehicle by using the BSD sensor, the yaw rate sensor, and the like, and turning off the high voltage relay of the high voltage battery at a moment at which when the rear-lateral side collision is determined.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling an environmentally-friendly vehicle, the system comprising:
   a rear-lateral side detection sensor configured to detect an expected collision time with and a distance from a collision object; and
   a controller configured to determine that a rear-lateral side collision occurs and block a connection of a relay of a battery of the vehicle when the expected collision time detected by the rear-lateral side detection sensor is equal to or smaller than a first threshold value and a distance from the collision object detected by the rear-lateral side detection sensor is equal to or smaller than a second threshold value.

2. The system of claim 1, wherein when a yaw rate detected by a yaw rate detection sensor is equal to or larger than a third threshold value before the connection of the relay of the battery of the vehicle is blocked, the controller blocks the connection of the battery of the vehicle.

3. The system of claim 1, wherein the rear-lateral side detection sensor is selected from the group consisting of: a blind spot detection (BSD) sensor, a lane change alert (LCA) sensor, and a rear cross traffic alert (RCTA) sensor.

4. The system of claim 1, wherein the rear-lateral side detection sensor is at least one of: a blind spot detection (BSD) sensor, a lane change alert (LCA) sensor, and a rear cross traffic alert (RCTA) sensor.

5. A system for controlling an environmentally-friendly vehicle, the system comprising:
   a rear-lateral side detection sensor configured to detect an expected collision time with and a distance from a collision object; and
   a controller configured to determine that a rear-lateral side collision occurs and block a connection of a relay of a battery of the vehicle when the expected collision time detected by the rear-lateral side detection sensor is equal to or smaller than a first threshold value, a distance from the collision object detected by the rear-lateral side detection sensor is equal to or smaller than a second threshold value, and a yaw rate detected by a yaw rate detection sensor is equal to or larger than a third threshold value.

6. The system of claim 5, wherein the rear-lateral side detection sensor is selected from the group consisting of: a blind spot detection (BSD) sensor, a lane change alert (LCA) sensor, and a rear cross traffic alert (RCTA) sensor.

7. The system of claim 5, wherein the rear-lateral side detection sensor is at least one of: a blind spot detection (BSD) sensor, a lane change alert (LCA) sensor, and a rear cross traffic alert (RCTA) sensor.

8. A method of controlling an environmentally-friendly vehicle, the method comprising:
- detecting, by a rear-lateral side detection sensor, an expected collision time with and a distance from a collision object;
- determining whether the expected collision time is equal to or smaller than a first threshold value;
- determining whether the distance is equal to or smaller than a second threshold value; and
- blocking a connection of a battery of the vehicle when the expected collision time is equal to or smaller than the first threshold value and the distance is equal to or smaller than the second threshold value.

9. The method of claim 8, further comprising:
- determining whether a yaw rate of the vehicle is equal to or larger than a third threshold value,
- wherein when the yaw rate is equal to or larger than the third threshold value, the connection of the battery of the vehicle is blocked.

10. The method of claim 8, wherein the rear-lateral side detection sensor is selected from the group consisting of: a blind spot detection (BSD) sensor, a lane change alert (LCA) sensor, and a rear cross traffic alert (RCTA) sensor.

11. The method of claim 8, wherein the rear-lateral side detection sensor is at least one of: a blind spot detection (BSD) sensor, a lane change alert (LCA) sensor, and a rear cross traffic alert (RCTA) sensor.

\* \* \* \* \*